United States Patent

[11] 3,596,269

| [72] | Inventor | Richard H. Laska<br>Rosemount, Minn. 55068 |
|---|---|---|
| [21] | Appl. No. | 770,531 |
| [22] | Filed | Oct. 25, 1968 |
| [45] | Patented | July 27, 1971 |

[54] STRUCTURAL DEFECT MONITORING DEVICE
10 Claims, 3 Drawing Figs.

[52] U.S. Cl. .................................................. 340/421,
324/51, 338/2, 340/256
[51] Int. Cl. ........................................................ G08b 21/00
[50] Field of Search .......................................... 340/421,
420, 253, 256, 227.1, 213; 338/2; 324/51, 52

[56] References Cited
UNITED STATES PATENTS

| 3,268,881 | 8/1966 | Vasel............................. | 340/213 |
| 3,426,217 | 2/1969 | Womble, Jr. ................. | 307/231 |
| 3,477,019 | 11/1969 | Hartmann ..................... | 324/52 |
| 3,509,942 | 5/1970 | Lindberg...................... | 169/2 |

Primary Examiner—Robert L. Richardson
Attorney—Alan G. Greenberg

ABSTRACT: This invention relates to a system for a detecting and monitoring structural defects in mechanical structures such as the skin of an aircraft. The system comprises a group of elongated conductive tapes of known electrical resistance bonded to the aircraft skin but insulated from it at a point which has a history or likelihood of failure. One end of the group of tapes is electrically grounded while the other is electrically connected to a resistance comparing or measuring device, as for example, an ohmmeter. A visual or audible warning device is provided in the form of a light or buzzer including a solenoid holding circuit to hold it on once energized. Thus when a crack or tear occurs in the aircraft skin the warning light or buzzer is energized and a reading of the ohmmeter shows the extent of damage by the degree of resistance change.

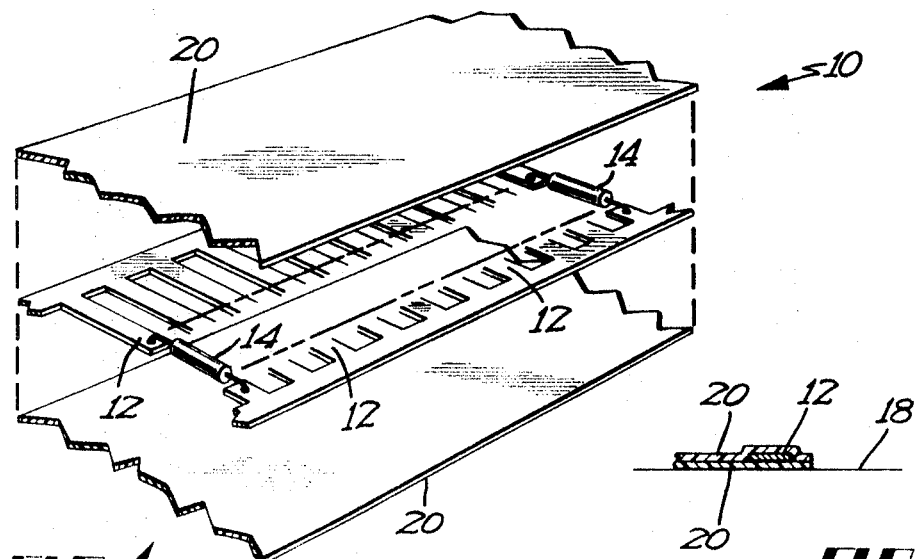
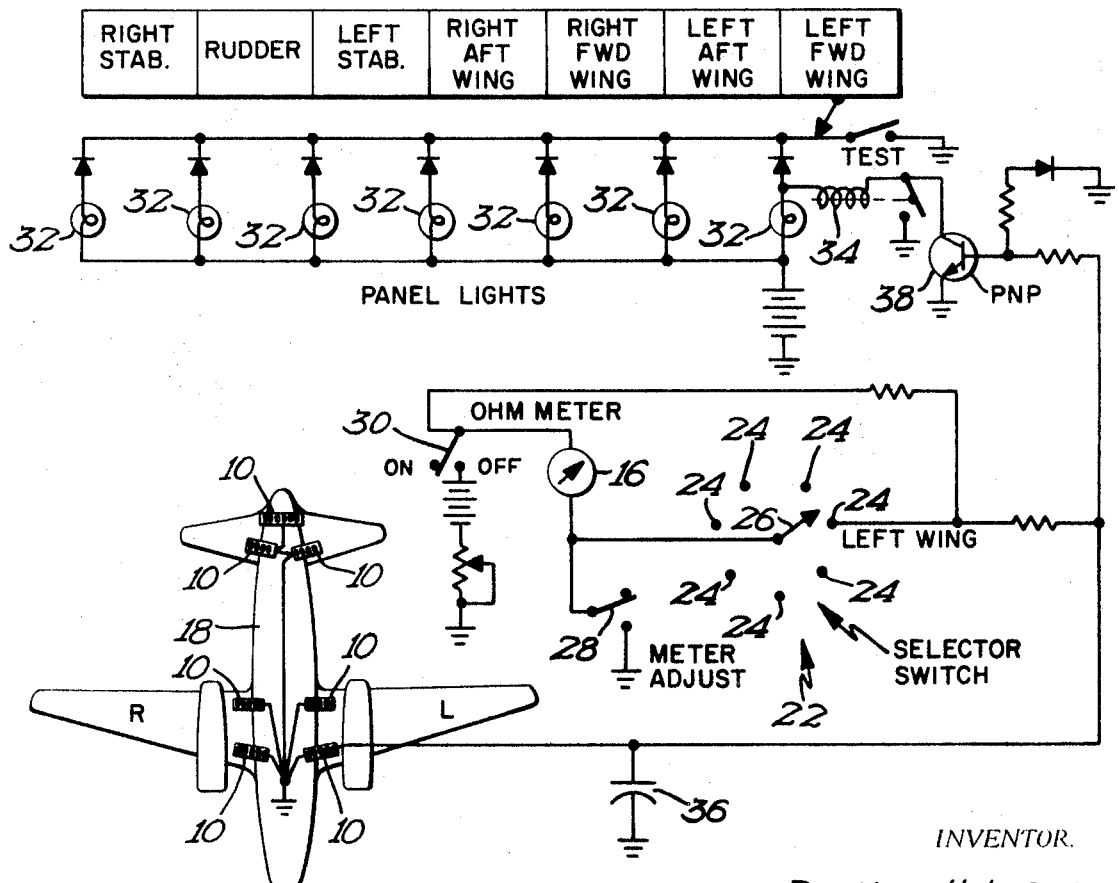

3,596,269

STRUCTURAL DEFECT MONITORING DEVICE

This invention relates to a system for detecting and monitoring structural defects in mechanical structures as, for example, the skin of an airplane.

The device of the invention is comprised of a group of conducting tapes bonded in intimate contact with, but electrically insulated from, the mechanical structure to be monitored. One end of the group of tapes is electrically grounded while the other end is electrically connected to an electrical resistance comparing or measuring device as, for example, an ohmmeter. An electrically operated visual or audible warning device is provided with an appropriate holding circuit to hold the warning device on, once energized. The warning device is adapted to be energized when the electrical resistance in the group of tapes exceeds a predetermined level.

There are, in the art, bonded stress analysis tapes, which upon the first examination appear similar to the present disclosure. However, the bonded stress analysis tapes are employed essentially singly on structures to be stressed to destruction for stress analysis of the model. They are applicable in giving only a strain reading and would not be useful in determining the extent of a fatigue tear or other crack in a metal surface as would the device of the present invention.

Referring now to the drawings:

FIG. 1 is a pictorial representation of the parallel elongated electrical conductors and supplemental resistors encased in a relatively thin insulating cover;

FIG. 2 is a cross section view depicting the elongated tape as sandwiched in the relatively thin insulating cover; and FIG. 3 is a schematic wiring diagram of the system of this disclosure.

A group of elongated relatively thin electrical conductors 10 is comprised of individual parallel connected conductors, as the metal foils 12. The metal foils 12 are electrically equivalent. In order to provide a more easily read change in the resistance of the metal foils 12, a supplemental resistance 14 is connected to each metal foil 12.

The group 10 is connected at one end to an electrical ground. The other end of the group 10 is electrically connected to a resistance comparing or measuring device, as for example, ohmmeter 16.

The group 10 is bonded into intimate but electrically insulated contact with the mechanical structure, as the aircraft skin 18.

The insulation of metal foils 12 suitably is accomplished by providing a relatively thin insulating cover in which the group 10 may be enclosed as shown by the hermetically sealed mylar tape 20 which may then be bonded to aircraft skin 18 at areas of suspected high stress.

Several groups of conductors 10 may be provided as above to monitor various points on the aircraft skin 18. To provide selective monitoring of the various groups 10, a multiposition switch 22 is provided. Multiposition switch 22 is provided with as many contacts 24 as there are groups 10. Each contact 24 being appropriately labeled with the position of the related group 10 on a control panel (not shown). The ohmmeter 16 would also be located on the aforementioned control panel. A selector switch 26 is employed to allow selection of the particular contact 24 for the monitoring circuit. A meter adjust 28 is provided as to allow the ohmmeter 16 to be calibrated. A master switch 30 is provided to turn the system on or off.

A visual or auditory warning system is coupled with the previously described system. While a light or a buzzer may be employed as the warning device, the drawings show a system including panel lights 32 for each group 10. The panel lights 32 are located on the control panel (not shown).

A solenoid holding circuit 34 is provided to hold the panel light 32 energized after it once is activated.

A capacitor 36, of such capacitance that it will not charge fully until the resistance of a group 10 increases beyond its normal value, is provided. A transistor 38 is provided so that the solenoid holding circuit 34 will not be energized until such time as transistor 38 is conducting. Transistor 38 will not commence conducting until capacitor 36 is charged.

In use the selector switch 26 may be periodically connected to the various contacts 24. If a defect or crack should be present the tapes 12 in group 10 bonded at the point of defect will break, changing the resistance of the group 10. The change in resistance of group 10 is read on ohmmeter 16. The degree of change in resistance of group 10 from the normal indicates the extent of the structural failure, to wit, the number of tapes 12 broken. If all tapes 12 in a group 10 are broken the resistance goes to infinity and the indication is that the break or crack on the structural member is severe.

If, at a time other than during the routine check of group 10 resistances, a resistance increase occurs, as previously described, the particular light 32 involved energizes and capacitor 36 charges and discharges to transistor 38 which then becomes conductive and energizes the holding circuit 34 maintaining light 32 on. The operator, seeing light 32 on, would then turn selector switch 26 to appropriate contact 24 to determine the extent of the structural failure. Once this is determined the operator's course of action is indicated. In an aircraft, for instance, speed may be reduced to alleviate the stress on a particular member.

While this disclosure relates to use of the system on aircraft, it will be readily appreciated that the system can be employed on any structure subject to fatigue failure or other structural defects.

I claim:

1. A device for detecting and monitoring failure of structure members comprising: at least two pluralities of elongated electrically conductive members, each of said elongated electrical conductor members being electrically equivalent to each of the other elongated electrical conductors, and each of said elongated electrical conductors being connected to electrical ground at one end thereof and in parallel with the other elongated electrical conductors; insulating means secured to said elongated electrical conductors for holding said elongated electrical conductors in intimate electrically insulated contact with the structural member; and an electrical resistance comparing member electrically connected to said plurality of elongated electrical conductors, said electrical resistance comparing member adapted to detect a change in electrical resistance of said plurality of elongated electrical connectors and each of said pluralities of elongated electrical conductors being selectively electrically connected to said electrical resistance comparing member so that any plurality of elongated electrical conductors may be periodically selectively checked for a change in resistance.

2. The device of claim 1 further characterized by an electrically operated warning device and holding circuit being electrically connected to each plurality of elongated electrical conductors so that if a change in electrical resistance occurs in a plurality of elongated connectors that said electrically operated warning device functions.

3. The device of claim 2 wherein the electrically operating warning device comprise a light and a solenoid holding circuit to keep said light on once energized.

4. The device of claim 2 wherein the electrically operated warning devices comprise a buzzer and a solenoid holding circuit to keep said buzzer sounding once energized.

5. A system for detecting and monitoring structural failure in operating components of a mechanical structural comprising: at least one group of parallel connected elongated conductors, one end of said group being connected to electrical ground; said group being secured to and electrically insulated from the mechanical structure; and an electrical resistance comparing device for measuring the deviation in resistance between a control electrical resistance and that of said group, said electrical comparing device including a visual indicator adapted to reflect the comparative electrical resistances of said control electrical resistance and that of said group.

6. The system of claim 5 further characterized by a plurality of groups of elongated conductors secured to the mechanical structure at various locations and each group being selectively electrically secured to the electrical resistance comparing device so that various locations on the mechanical structure may be periodically selectively examined for structural failure.

7. The system of claim 6 further characterized by the elongated conductors comprising a relatively thin conductive foil and said parallel foils being bonded to and insulated from the mechanical structure so as to follow compound curves in said mechanical structure.

8. The device of claim 7 further characterized by an electrical warning device electrically connected to each group of parallel elongated conductors and including a solenoid holding circuit so that once energized said warning device remains on.

9. The device of claim 8 wherein said warning device is a light.

10. The device of claim 8 wherein said warning device is a buzzer.